(12) United States Patent
Kazemi et al.

(10) Patent No.: US 10,893,381 B2
(45) Date of Patent: Jan. 12, 2021

(54) DETERMINING LOCATION SYSTEM SIGNAL QUALITY

(71) Applicant: Apple Inc., Cupertino, CA (US)

(72) Inventors: Pejman Lotfali Kazemi, San Jose, CA (US); Glenn Donald MacGougan, San Jose, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/281,300

(22) Filed: Feb. 21, 2019

(65) Prior Publication Data

US 2019/0191275 A1 Jun. 20, 2019

Related U.S. Application Data

(63) Continuation of application No. 14/292,793, filed on May 30, 2014, now abandoned.

(51) Int. Cl.
*H04W 4/02* (2018.01)
*G01S 19/23* (2010.01)
*G01S 19/39* (2010.01)
*G01S 19/28* (2010.01)

(52) U.S. Cl.
CPC ............ *H04W 4/025* (2013.01); *G01S 19/23* (2013.01); *G01S 19/39* (2013.01); *G01S 19/28* (2013.01)

(58) Field of Classification Search
CPC .......... G01S 19/23; G01S 19/28; G01S 19/39; H04W 4/025
See application file for complete search history.

(56) References Cited

U.S. PATENT DOCUMENTS

| | | | |
|---|---|---|---|
| 8,077,082 B1 * | 12/2011 | Kling | G01S 19/36 342/357.25 |
| 8,660,578 B1 | 2/2014 | Yang et al. | |
| 2003/0011835 A1 * | 1/2003 | Elbers | H04B 10/07953 398/5 |
| 2004/0095276 A1 | 5/2004 | Krumm et al. | |
| 2004/0109612 A1 | 6/2004 | Park | |
| 2008/0274728 A1 * | 11/2008 | Anderson | H04W 36/08 455/423 |
| 2008/0312826 A1 * | 12/2008 | Shahrestani | G01C 21/3611 701/533 |
| 2009/0009936 A1 | 1/2009 | Neu et al. | |
| 2009/0131131 A1 | 5/2009 | Wilson et al. | |
| 2011/0208429 A1 | 8/2011 | Zheng | |

(Continued)

OTHER PUBLICATIONS

Chan et al., "True random number generator using GPUs and Histogram equalization techniques," 2011 IEEE International Conference on High Performance Computing and Communications, IEEE Computer Society, p. 161-170 (2011).

*Primary Examiner* — Kyle R Quigley
(74) *Attorney, Agent, or Firm* — Jaffery Watson Mendonsa & Hamilton LLP

(57) ABSTRACT

Among other things, we describe a method that includes, on an electronic device, determining that a current quality metric of signals received by a location system of the electronic device does not meet a threshold quality metric, and based on the determination, selecting a recommendation for changing a position of the device in a manner that would alter the current quality metric. This aspect can also include corresponding systems, apparatus, and computer program products stored on a storage device.

24 Claims, 8 Drawing Sheets

(56) References Cited

U.S. PATENT DOCUMENTS

| | | |
|---|---|---|
| 2011/0212699 A1 | 9/2011 | Howard et al. |
| 2011/0269418 A1 | 11/2011 | Kangas |
| 2012/0050108 A1 | 3/2012 | Whiting et al. |
| 2012/0176376 A1 | 7/2012 | Kim et al. |
| 2012/0208525 A1* | 8/2012 | Mochida ........... H04M 1/72502 455/422.1 |
| 2013/0040655 A1 | 2/2013 | Keidar et al. |
| 2013/0335273 A1 | 12/2013 | Pakzad |
| 2013/0336138 A1 | 12/2013 | Venkatraman et al. |
| 2014/0213298 A1 | 7/2014 | Marti et al. |
| 2014/0244209 A1* | 8/2014 | Lee .................... G06K 9/00342 702/150 |
| 2014/0330998 A1 | 11/2014 | Dees et al. |
| 2015/0347351 A1 | 12/2015 | Kazemi et al. |
| 2015/0365796 A1 | 12/2015 | Toni et al. |
| 2017/0201856 A1 | 7/2017 | Wilbur et al. |

* cited by examiner

DETERMINING LOCATION SYSTEM SIGNAL QUALITY

CROSS-REFERENCE TO RELATED APPLICATION

This application is a continuation of U.S. application Ser. No. 14/292,793, filed May 30, 2014, and titled "Determining Location System Signal Quality," which is incorporated by reference.

TECHNICAL FIELD

The disclosure generally relates to determining signal quality of a geographic location system and determining a recommendation for changing the position and/or orientation of a device that uses the location system.

BACKGROUND

A mobile device can include one or more location-based applications that are configured to perform location-specific tasks. A mobile device equipped with a receiver of a global navigation satellite system (GNSS), such as the Global Positioning System (GPS), can use a location determined by the GNSS as an input to a location-based application running on the mobile device. The ability of the GNSS receiver to receive data from satellites can depend on a variety of factors.

SUMMARY

In one aspect, in general, a method includes, on an electronic device, determining that a current quality metric of signals received by a location system of the electronic device does not meet a threshold quality metric, and based on the determination, selecting a recommendation for changing a position of the device in a manner that would alter the current quality metric. This aspect can also include corresponding systems, apparatus, and computer program products stored on a storage device.

Implementations may include one or more of the following features. The method includes computing data describing quality of the signals received by the location system, and determining, from a set of location system signal quality profiles, a signal quality profile that most closely matches the computed data. The computed data comprises at least one of a cumulative distribution function and a histogram. The threshold quality metric comprises a determination that the signal quality profile that most closely matches the computed data is designated as a signal quality profile indicating low signal quality. The method includes determining a classification of a current activity of a user of the electronic device, and where the recommendation is selected based on the determined classification. The classification is determined when the current quality metric does not meet the threshold quality metric, and where the classification is not determined when the current quality metric does meet the threshold quality metric. The method includes displaying, on a user interface of the electronic device, a visual representation of the recommendation. The current quality metric is determined based on a vector of signal to noise ratios of the received signals. The current quality metric is selected from a set of quality metrics, and where the threshold quality metric is one or more of the quality metrics of the set. The current quality metric comprises a cumulative distribution function computed based on multiple histograms computed over a time period.

Particular implementations provide at least the following advantages. A mobile device can determine information related to signal quality of a location system. This information can be used to improve the experience of a user of the mobile device, e.g., by enabling the mobile device to provide a recommendation for changing the position or orientation or both of the mobile device and potentially improving signal quality. The recommendation can be tailored to a current activity of the user of the mobile device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
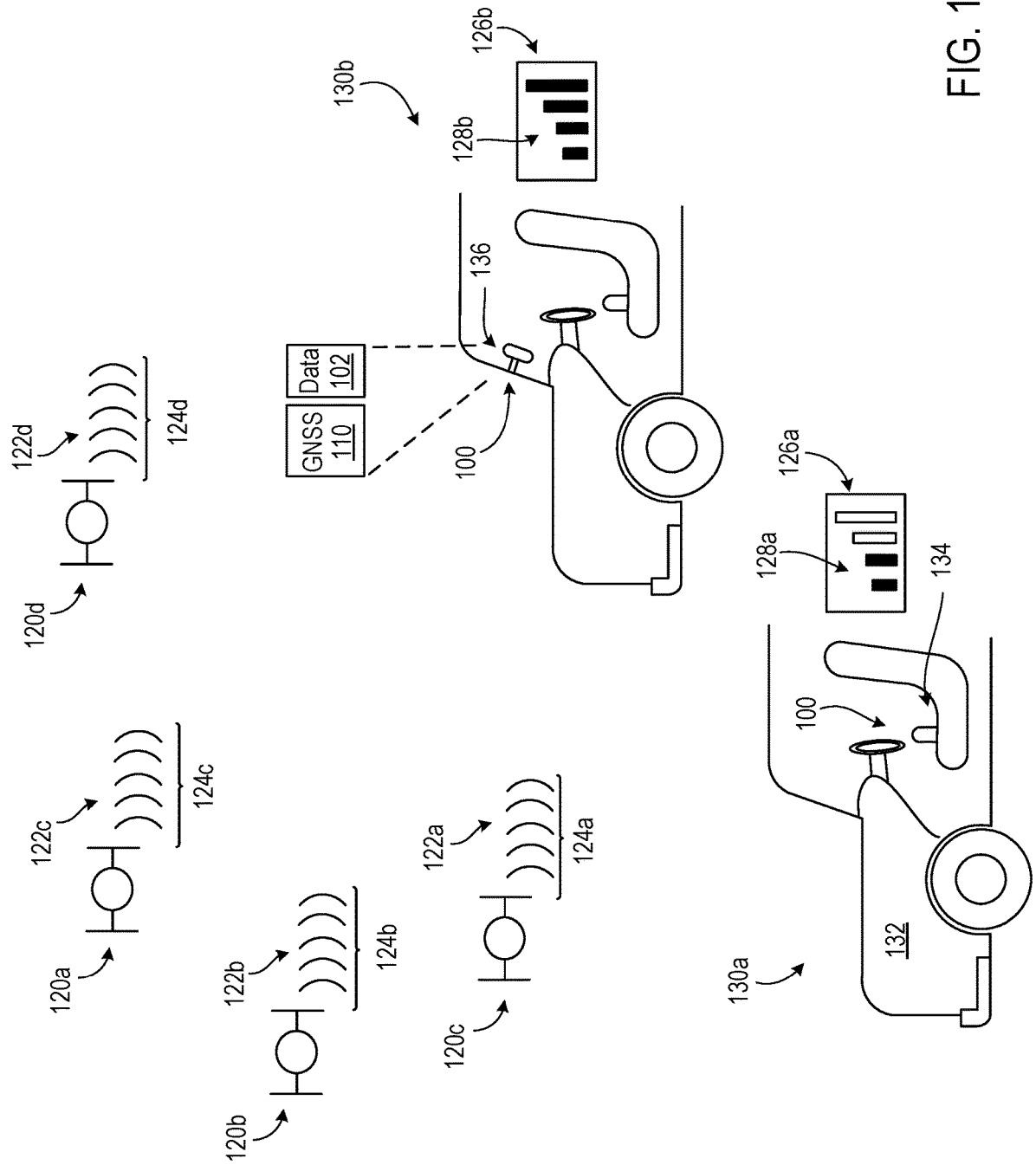
FIG. 1 is a block diagram of a mobile device and related components.

Some mobile devices, such as smartphones, can run applications that make use of a data received from a global navigation satellite system (GNSS) receiver, such as a Global Positioning System (GPS) receiver. Location applications that use GNSS functionality can indicate location information to a user of the smartphone such as where he is, where he has been, what direction he is traveling, how fast he is traveling, and other location information. A GNSS receiver typically receives signals from multiple satellites and uses the signals to calculate location information such as the current location of the device.

The GNSS receiver can determine location information, such as the current location of the device, if the GNSS receiver receives signals from a sufficient number of satellites at appropriate signal strength. For example, a GNSS receiver may not be able to determine reliable location information unless the GNSS receiver is receiving signals at or above a particular signal strength from at least three satellites. Further, the integrity (e.g., accuracy and precision) of the determined location information may be affected by the number of sufficiently strong signals available to the receiver. For example, the integrity of the determined location may be greater as the receiver receives stronger signals from more satellites. In contrast, the integrity of the determined location may be reduces as the receiver receives weaker (attenuated) signals from fewer satellites. Thus, location applications, e.g., any applications running on the device that depend on location information, will benefit when the receiver can determine location information using strong signals from satellites.

The ability of the GNSS receiver to receive signals from satellites may depend on the position and/or orientation of the mobile device. For example, if the device is positioned in a user's pocket, the received signals may be attenuated compared to signals received when the device is held by the user in his/her hand. Similarly, if the device is located in an automobile's console or glove compartment, the received signals may be attenuated compared to signals received when the device is positioned in a windshield-mounted cradle. As another example, if the device is oriented such that the GNSS receiver component(s) are oriented down toward the earth's surface, the received signals may be attenuated compared to signals received when the device is oriented such that the GNSS receiver components(s) are oriented toward the earth's atmosphere where the satellites are located. Thus, location applications running on the device will benefit when the device is positioned and/or oriented in a manner optimized for receiving strong signals from satellites.

The device can quantify the signal quality (e.g., signal strength and number of signals) of the received signals and determine whether the receiver is receiving relatively high-quality signals or relatively low-quality signals. For example, the device may compare the currently received signals to stored profiles representing different levels of signal strength. A profile that most closely matches data representing the currently received signals can also represent a current signal quality level.

If the device determines that the GNSS receiver is receiving low-quality signals (e.g., receiving signals that correspond to a profile of low-quality signals), the device can provide feedback on a user interface making suggestions to a user for improving the position and orientation of the device. For example, the user interface could display a graphic suggesting that the user move the device from his/her pocket to his/her hand.

FIG. 1 shows an example of a mobile device 100 (e.g., a wireless mobile device) that runs location-aware applications. Location information used by a location application can be received from a GNSS module 110 that determines a physical location of the mobile device 100, e.g., expressed as longitude and latitude. The GNSS module 110 may include one or more physical components, such as an antenna and baseband processor, and may also include executable code which, when executed, processes the signals received by the physical components and provides data representing the signals to other components of the mobile device 100. In general, any module of the mobile device 100 may include physical components such as hardware, executable components such as software, or both.

In some examples, the GNSS module 110 determines a physical location of the mobile device by receiving data from satellites 120a-d orbiting the earth and calculating a location based on the received data. For example, the satellites 120a-d can transmit signals 122a-d that carry data 124a-d such as timing data. The signals 112a-d are received and interpreted by the GNSS module 110 to determine location information 102.

The integrity (e.g., accuracy and precision) of the location information depends on the number of signals 122a-d received by the GNSS module 110 as well as the signal strength of each signal 122a-d. When the GNSS module 110 calculates the location information 102, the GNSS module 110 performs mathematical calculations using the data 124a-d carried by the signals 122a-d. If a particular signal 122a is weak (e.g., the signal 122a as received by the GNSS module has too low of a signal-to-noise ratio), then the GNSS module 110 may not be able to interpret the signal 122a and determine the data 124a carried by the signal 122a. The strength of each signal 122a-d may depend on various factors, including the physical location and/or orientation of the mobile device 100. For example, if the GNSS module 110 includes a satellite antenna, the position and orientation of the mobile device affects the position and orientation of the satellite antenna. The satellite antenna may be able to receive stronger signals (e.g., absorb a greater amount of signal energy) in some positions and orientations of the mobile device 100 than other positions and orientations of the mobile device 100. The combination of the strength of signals received by the mobile device, and the total number of the signals received, is sometimes referred to as signal quality. Generally, signal quality is higher when more signals are received, or the strength of the signals is higher, or both. For example, the ability of the device 100 to determine a precise and/or accurate location may improve as the number of satellites providing sufficiently strong signals increases.

Two example arrangements 130a-b are shown in the figure. In both arrangements 130a-b, the mobile device 100 is carried in an automobile 132. In the first arrangement 130a, the mobile device 100 is held in a console 134 between seats of the automobile 132. In this arrangement 130a, physical items in the car such as the seats or dashboard may absorb some of the signal energy of the satellite signals 124a-d, attenuating the signals as received by the mobile device 100. As a result, the mobile device 100 may be able to interpret fewer signals 124a-d than the mobile device 100 would have in other positions and orientations, and so the integrity of the location information 102 may be affected in a way such that the accuracy and precision of the location information 102 is reduced.

In contrast, the second arrangement 130b shows the mobile device 100 mounted in a cradle 136 mounted on a windshield of the automobile 132. In this arrangement 130b, the mobile device 100 is positioned in a way such that other physical items in the car are less likely to absorb signal energy of the satellite signals 124a-d, thus increasing the likelihood that signal energy of the satellite signals 124a-d will be absorbed by a component of the GNSS module 110. As a result, compared to the first arrangement 130a, the mobile device 100 in the second arrangement 130b is able to receive the satellite signals 124a-d with greater signal strength. Further, the integrity of the location information 102 is likely to be better because the GNSS module 110 is more likely to have access to more of the data 124a-d carried by the signals, since more of the signals will be strong enough for the GNSS module 110 to interpret.

In some implementations, the mobile device 100 may have a user interface 104 that can be used to display information about the strength of the satellite signals 124a-d as received by the mobile device 100. A user of the mobile device 100 can use the information to determine, for example, if the position and/or orientation of the mobile device 100 should be changed to improve the strength of the received signals. For example, in the first arrangement 130a, the mobile device 100 displays an indicator 126a representative of the signal quality 128a at a particular point in time. Here, the indicator 126a includes four bars, of which two are highlighted, indicating that the signal quality 128a is not particularly good compared to a signal quality in which more of the bars would be highlighted. In contrast, in the second arrangement 130b, the indicator 126b displayed on the mobile device 100 includes four bars, of which all four are highlighted, indicating that the signal quality 128b in this arrangement 130b is very good and better than, for example, the signal quality 128a in the first arrangement 130a.

Because location applications running on the mobile device 100 depend on location information 102, the location applications are capable of driving a better user experience if the signal quality 128a, 128b is high enough to enable the mobile device 100 to determine location information 102 of high integrity. For example, the mobile device 100 will be able to display (e.g., display on a user interface) accurate and precise location information, such as where the user is and how fast the user is traveling, if the integrity of the location information 102 is high. For this reason, the mobile device 100 may also be configured to suggest to the user that the position and/or orientation of the mobile device 100 should be changed if the quality of the satellite signals 124a-d is poor.

Figure 2:
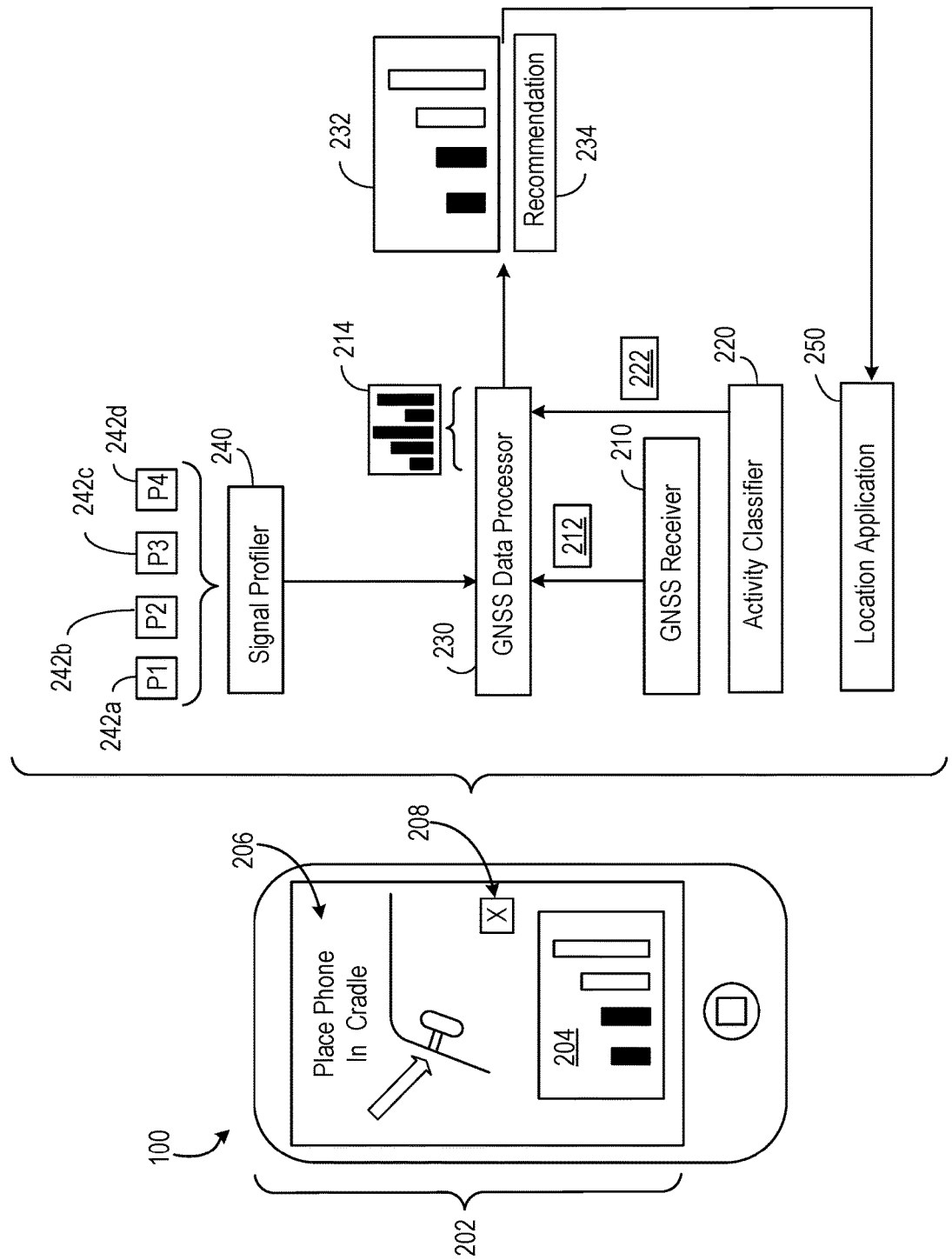
FIG. 2 shows the mobile device with a user interface that displays information relevant to the integrity of location information determined by the mobile device.

FIG. 2 shows the mobile device 100 with a user interface 202 that displays information relevant to the integrity of location information determined by the mobile device 100. Here, the mobile device 100 displays a quality indicator 204 of the quality of satellite signals received by the mobile device 100. The quality indicator 204 shows two bars out of four as highlighted, which indicates a relatively poor signal quality. The mobile device 100 also displays a recommendation icon 206 related to the quality of the satellite signals. Here, the recommendation icon 206 represents a recommendation that the user of the mobile device 100 should consider moving the mobile device 100 to a windshield cradle (e.g., as shown in the second arrangement 130b in FIG. 1) in order to increase the signal quality.

The mobile device 100 determines whether to display a recommendation icon 206, and what recommendation should be represented by the recommendation icon 206, based on multiple factors. In some implementations, the recommendation icon 206 is chosen based on a metric of signal quality (e.g., based on whether signal quality meets a particular threshold) and is also chosen based on a classification of an activity engaged in by the user of the mobile device 100. For example, the mobile device 100 includes one or more modules that can determine signal quality of the signals received by the device as well as one or more modules that can determine information describing an activity engaged in by the user (e.g., walking, running, driving in an automobile, etc.). Together, this information can be used by the mobile device 100 to infer information about the position and/or orientation of the mobile device 100. For example, the mobile device 100 may determine that the user of the mobile device 100 is likely driving or riding in an automobile, and the mobile device 100 may also determine that the signal quality of signals received by the mobile device 100 is poor (e.g., the signal quality does not meet a threshold indicating acceptable signal quality). Based on this information, the mobile device 100 can make an inference that the signal quality can be increased if the user places the mobile device 100 at a better position within the automobile, such as the windshield cradle represented by the recommendation icon 206.

The mobile device 100 can display the recommendation icon 206 (or any other icon or visualization associated with signal quality) at any time when signal quality does not meet a threshold indicating acceptable signal quality. In some implementations, the mobile device 100 displays the recommendation icon 206 on a continuous basis. For example, the recommendation icon 206 may be displayed in the user interface 202 when the mobile device 100 makes an initial determination that signal quality is not acceptable, and the recommendation icon 206 remains in the user interface 202 until signal quality is determined to be acceptable. In some implementations, the mobile device 100 displays the recommendation icon 206 on an intermittent basis. For example, the recommendation icon 206 may be displayed in the user interface 202 when the mobile device 100 makes an initial determination that signal quality is not acceptable, but then the recommendation icon 206 is removed from display after a period of time (e.g., 10 seconds). This may be done based on user experience considerations, e.g., a user may choose not to follow the recommendation represented by the recommendation icon 206 and may not want the recommendation icon 206 to be displayed after he/she has viewed and considered the recommendation. In these implementations, the mobile device 100 may remove the recommendation icon 206 from display after a period of time, but later display the recommendation icon 206 a second time (e.g., after another period of time such as 5 minutes or ten minutes) if signal quality continues to be unacceptable. In some implementations, the user interface 202 may provide a button 208 or other user interface element that enables the user to dismiss the recommendation icon 206.

In some implementations, the mobile device 100 displays the recommendation icon 206 after a period of time or poor signal quality has elapsed. For example, the mobile device 100 may not display the recommendation icon 206 immediately after a determination is made that the signal quality does not meet the threshold indicating acceptable signal quality. Instead, the mobile device 100 may wait a period of time, such as one minute or five minutes, so that the recommendation icon 206 need not be displayed if the signal quality is unacceptable for only a short period of time. In some implementations, the mobile device 100 may evaluate signal quality over a span of time to determine whether the recommendation icon 206 should be displayed. For example, the mobile device 100 may display the recommendation icon 206 if signal quality has fallen below a threshold for a percentage of a span of time. As a specific example, the mobile device 100 may display the recommendation icon 206 if signal quality has been unacceptable for five of the last fifteen minutes, even if signal quality was unacceptable for short stretches of the fifteen minute span and acceptable for longer stretches of the fifteen minute span.

In some implementations, feedback in addition to or instead of the recommendation icon 206 is provided to the user of the mobile device 100. For example, the mobile device 100 may provide textual feedback, e.g., "Please move your device to a different location." As another example, the mobile device 100 may provide audio feedback, e.g., a synthesized or pre-recorded audio message of "Please move your device to a different location."

In some implementations, the modules of the mobile device 100 include a GNSS receiver 210 and an activity classifier 220. Both the GNSS receiver 210 and the activity classifier 220 pass data 212, 222 to a GNSS data processor 230. The GNSS data processor 230 uses this data to determine, for example, a quality metric of signal quality and/or a recommendation for changing the position and/or orientation of the mobile device 100.

The GNSS receiver 210 receives GNSS signals transmitted from satellites (e.g., as shown in FIG. 1). The GNSS receiver 210 passes data 212 representing the signals to the GNSS data processor 230. For example, the data 212 may include values for a signal-to-noise ratio (sometimes, in the case of digital signals, referred to as a carrier-to-noise ratio)

of each of the signals received by the GNSS receiver 210. In some implementations, the data 212 includes a vector of these values The GNSS data processor 230 can use the data 212 to determine information about signal quality of the signals received by the GNSS receiver 210. For example, the GNSS data processor 230 can calculate a value for a metric of signal quality. A metric of signal quality represents the results of measuring signal quality. If signal quality is relatively high, the metric will have a value associated with high signal quality, and if the signal quality is relatively low, the metric will have a different value associated with low signal quality.

A metric of signal quality can take on one of several kinds of forms. For example, the metric of signal quality may be a continuous range, such as any percentage between 0% to 100%. As another example, the metric of signal quality could also be associated with discrete quantitative values, such as "1," "2," and "3," and/or discrete qualitative values, such as "poor," "neutral," and "good."

In some implementations, the metric of signal quality is determined based on stored profiles of signal quality. For example, the mobile device may include a signal profiler module 240 that includes stored signal profiles 242a-d corresponding to different metrics of signal quality. Each stored signal profile 242a-d may include data derived from signals measured under different conditions. For example, one stored signal profile 242d may include data derived from satellite signals measured when conditions were favorable to signal quality (thus rendering good signal quality in the signals received by the device that derived the data), while another stored signal profile 242a may include data derived from satellite signals when conditions were unfavorable to signal quality (thus rendering poor signal quality in the signals received by the device that derived the data). Each stored signal profile 242a-d can be associated with a respective signal quality metric value.

The GNSS data processor 230 can query the signal profiler 240 to determine which stored signal profile 242a-d represents a measurement of signal quality that is closest to a measurement of signal quality of signals being received by the GNSS receiver 210 at the present moment. This determination can then be used to assign a value to the signal quality metric. For example, if the GNSS data processor 230 calculates data based on signals received at the present moment, and the data is similar to data of a stored signal profile 242d that includes data derived from satellite signals measured when conditions were favorable to signal quality, then the GNSS data processor 230 can assign a value associated with the stored signal profile 242d and indicating that current signal quality is good. For example, the value can be stored in a register or other data storage location representing a current signal quality metric. If the data is similar to data of a stored signal profile 242a that includes data derived from satellite signals measured when conditions were unfavorable to signal quality, then the GNSS data processor 230 can assign a value associated with the stored signal profile 242a and indicating that current signal quality is poor.

In some implementations, the GNSS data processor 230 assesses signal quality by computing a histogram 214 of the data 212. For example, if the data 212 received from the GNSS receiver 210 includes a vector of signal-to-noise (e.g., carrier-to-noise) data collected over a period of time (e.g., N seconds), a histogram 214 can include multiple ranges of carrier-to-noise ratios, and can include the number of signals that have a carrier-to-noise ratio within each specified range.

A cumulative distribution function (CDF) can be computed from the histogram 214 and compared to a CDF stored in association with each stored signal profile 242a-d. This technique is described further below with respect to FIGS. 3-5. Each stored signal profile 242a-d can correspond to values for a signal quality metric. For example, one stored signal profile 242a may correspond to very poor signal quality, which may be represented by a value of 1 on a scale of 1 to 4. Another stored signal profile 242b may correspond to poor signal quality and a value of 2. A third stored signal profile 242c may correspond to good signal quality and a value of 3, and a fourth stored signal profile 242d may correspond to very good signal quality and a value of 4.

In the example shown in the figure, the GNSS data processor 230 has determined that the data derived from the current signal conditions corresponds to a profile associated with poor signal quality, represented by a value of 2. The GNSS data processor 230 then outputs this value 232 to other systems of the mobile device 100 that can make use of this value, e.g., a location application 250 running on the mobile device 100. As one example, the user interface 202 of the mobile device 100 can display a signal quality indicator 204 having four bars, two of which are highlighted, which is a graphical representation of the value of 2 determined for the signal quality metric. For example, the signal quality indicator 204 can be displayed in connection with the execution of the location application 250.

In some implementations, the signal quality indicator is displayed in accordance with user experience concerns. For example, a signal quality indicator 204 displaying one bar may be undesirable from a user experience perspective, e.g., a user of the mobile device 100 may perceive a one-bar signal quality indicator 204 as indicating that the mobile device 100 is damaged or malfunctioning. For this reason, the GNSS data processor 230 may be configured to output a value 232 associated with very poor signal quality (e.g., one bar on a four bar scale) only on rare occasions, such as when signal quality is extremely bad (e.g., when signal quality is in the fifth percentile or below).

As noted above, the user interface 202 can also display a recommendation icon 206 that is based on both a signal quality metric as well as a classification of an activity engaged in by a user of the mobile device 100. Further, the mobile device 100 has an activity classifier 220 which can make a determination as to what activity is being engaged in by the user. For example, the activity classifier 220 may receive information from one or more modules of the mobile device 100 such as accelerometers which provide information about the current conditions of the mobile device 100 with respect to motion. The information about the current conditions with respect to motion can be used to make an inference about the current activity of the user. As one example, in some implementations, the activity classifier 220 may make a determination that a user of a mobile device is driving an automobile if the information available to the activity classifier 220 indicates that the mobile device is moving between 20 and 100 miles per hour and that a pattern of vibrations detected by an accelerometer is consistent with vehicular motion. As another example, in some implementations, the activity classifier 220 may make a determination that a user of a mobile device is jogging if the information available to the activity classifier 220 indicates that the mobile device is moving between 5 and 10 miles per hour and that a pattern of vibrations detected by an accelerometer is consistent with jogging motion.

The GNSS data processor 230 can use data 222 provided by the activity classifier 220, augmenting data 212 provided by the GNSS receiver 210, to determine a recommendation 234 for changing the position and orientation of the mobile device 100. In some implementations, the recommendation 234 is determined based on whether the value 232 of the signal quality metric does or does not meet a threshold. For example, if the GNSS data processor 230 measures signal quality to be good, the position and/or orientation of the mobile device 100 does not need to be changed. Thus, in this example, the GNSS data processor 230 may not output a recommendation. In contrast, if the GNSS data processor 230 measures signal quality to be poor, the position and/or orientation of the mobile device 100 should be changed to improve signal quality, and the GNSS data processor 230 can output a recommendation. The determination of whether or not to output a recommendation can be based on a threshold quality metric. The threshold quality metric represents a boundary between values of quality metrics for which the position and/or orientation of the mobile device 100 should be changed and values of quality metrics for which the position and/or orientation of the mobile device 100 need not be changed. For example, if the value 232 of the quality metric is "1" or "2" then the signal quality is poor and the position and/or orientation of the mobile device 100 should be changed. In contrast, if the value 232 of the quality metric is "3" or "4" then the position and/or orientation of the mobile device 100 need not be changed. In these examples, the threshold quality metric can be defined as 3 or greater. Thus, if the value 232 of the quality metric is 3 or greater then the value 232 meets (e.g., satisfies) the threshold quality metric and the GNSS data processor 230 need not output a recommendation (or can output a recommendation of "no adjustment needed" or a similar trivial/default recommendation).

In some implementations, the recommendation 234 includes information specific to an activity. For example, if the quality metric indicates that the signal quality is poor, and the activity classifier 220 indicates that the user is likely running, then the recommendation 234 can include data representative of a recommendation to place the mobile device 100 on an armband to increase signal quality. As another example, if the quality metric indicates that the signal quality is poor, and the activity classifier 220 indicates that the user is likely riding in a vehicle, then the recommendation 234 can include data representative of a recommendation to place the mobile device 100 in a windshield-mounted cradle to increase signal quality. As another example, if the quality metric indicates that the signal quality is poor, and the activity classifier 220 indicates that the user is likely walking, then the recommendation 234 can include data representative of a recommendation to place the mobile device 100 in the user's hand to increase signal quality. The recommendation 234 need not contain data specific to a particular action (e.g., moving the mobile device to a windshield cradle), but instead may simply indicate an activity (e.g., the recommendation may include data indicating that the user is likely in a moving vehicle). In contrast, if the value 232 indicates that the signal quality is good (e.g., the signal quality metric satisfies the threshold quality metric) then the GNSS data processor 230 need not consult the activity classifier 220 since no recommendation is necessary.

The recommendation 234 can be provided, for example, to a location application 250 executing on the mobile device 100. In some implementations, the location application 250 chooses a recommendation icon 206 to display in the user interface 202 based on the recommendation 234. For example, the mobile device 100 may store on icon representative of a recommendation to change the position/orientation of a mobile device when the user is walking, a different icon representative of a recommendation to change the position/orientation of the mobile device when the user is running, etc. The icon to be displayed can be chosen based on the recommendation 234. In some implementations, the icon is chosen by the GNSS data processor 230 and provided to a location application 250 or another module of the mobile device 100. In some implementations, the threshold quality metric depends on the classification of the current activity. For example, the threshold can be made higher or lower depending on the activity. As a real-world example, a mobile device 100 located in a moving vehicle may be likely to encounter signal quality problems because a moving vehicle is likely to expose the mobile device 100 to a greater variation in signal quality as the vehicle moves through geographical areas having different characteristics. Thus, referring to the above example of a quality metric range of 1 to 4, the threshold quality metric for vehicular motion used by the GNSS data processor 230 may be set at 4. In this way, if the value 232 of the quality metric is 3 or below, the mobile device 100 will display a recommendation icon 206 indicating that the user should, to ensure good signal quality, position the mobile device in a windshield-mounted cradle (where signal quality is more likely to be high regardless of current conditions). Thus, if the user subsequently moves the device to a better location such as the suggested windshield cradle, then the signal quality will be maintained at a higher level in a variety of signal conditions than if the mobile device 100 had not been moved. In contrast, in this example, if the activity classifier determines that the mobile device 100 is likely being carried by a user who is running, the threshold quality metric used by the GNSS data processor 230 may be set at 3. In this way, if the value 232 of the quality metric is 2 or below, the mobile device 100 will display a recommendation icon 206 indicating that the user should, to ensure good signal quality, position the mobile device 100 on an armband. The threshold for activities such as running can be lower than the threshold for activities such as vehicular travel because activities such as running are less likely to expose the mobile device 100 to a variety of signal conditions including bad signal conditions.

In some examples, each stored signal profile 242a-d can indicate a cumulative distribution function (CDF) carrier-to-noise data collected over a period of time (e.g., N seconds). In these examples, the GNSS data processor 230 can determine a stored signal profile 242a-d that matches current signal conditions by calculating a histogram 214 of the carrier-to-noise ratios of signals collected over the last N seconds, computing a CDF of the histogram, and providing the CDF to the signal profiler 240. The signal profiler 240 can then compare the data to the stored signal profiles 242a-d and determine which stored profile has a CDF that most closely resembles the CDF of the current signals. In some implementations, the data 212 received from the GNSS receiver 210 could be stored in a buffer and a smoothing algorithm (e.g., a Kalman Filter) could be applied to the buffer so that the signal profiler 240 chooses a stored signal profile 242a-d representative of signal quality over a period of time, even if signal quality changes abruptly on one or more occasions over that period of time. In some implementations, multiple histograms 214 are stored in a buffer, e.g., histograms calculated on multiple occasions over a period of time, e.g. over the last N seconds. The histograms can be combined (e.g., values represented by the histograms can be averaged, or the values represented by the histograms can be added together, or another combination technique can be used) and the combination of the histogram can be compared to the stored signal profiles 242a-d.

Figure 3:
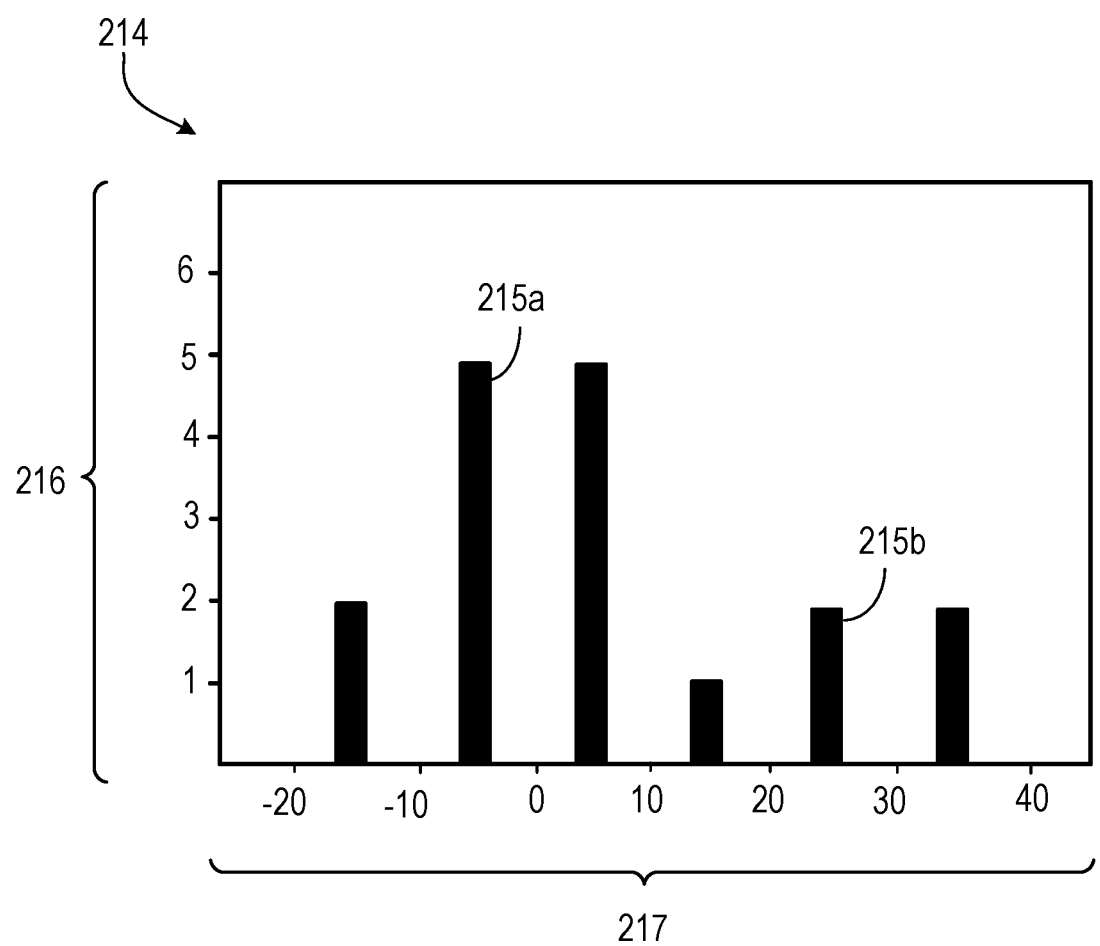
FIG. 3 shows a histogram of carrier-to-noise ratios.

FIG. 3 shows a histogram 214 of carrier-to-noise ratios. For example, the histogram 214 can be computed based on the data 212 received from the GNSS receiver 210 shown in FIG. 2. The histogram shows the number of signals having carrier-to-noise ratios in the specified range. The x-axis 217 specifies the ranges of carrier-to-noise ratios and the y-axis specifies the number of signals having a carrier-to-noise ratio in the specified range. In this example, for example, one bar 215a indicates that five signals had carrier-to-noise ratios in the range of −10 db to 0 db, and another bar 215b indicates that two signals had carrier-to-noise ratios in the range of 20 db to 30 db.

A cumulative distribution function (CDF) can be computed from the histogram 214. For example, the CDF can be calculated by the GNSS data processor 230 or the signal profiler 240 shown in FIG. 2. The CDF describes the probability that a variable will be less than or equal to a particular value based on a body of source data. For example, the particular value can be a carrier-to-noise ratio, and the body of source data can be the data 212 used to compute the histogram 214. In some implementations, the CDF is calculated from a combination of multiple histograms (e.g., histograms computed on multiple occasions over a period of time).

As described above, the signal profiler 240 can compare the CDF of received signal data (e.g., the data 212 shown in FIG. 2) to a CDF associated with one of the stored signal profiles 242a-d. The stored signal profile 242a-d having a CDF that most closely matches the CDF derived from the data 212 (e.g., computed from the histogram 214) can be chosen as the stored signal profile 242a-d representative of current signal quality.

Figure 4:
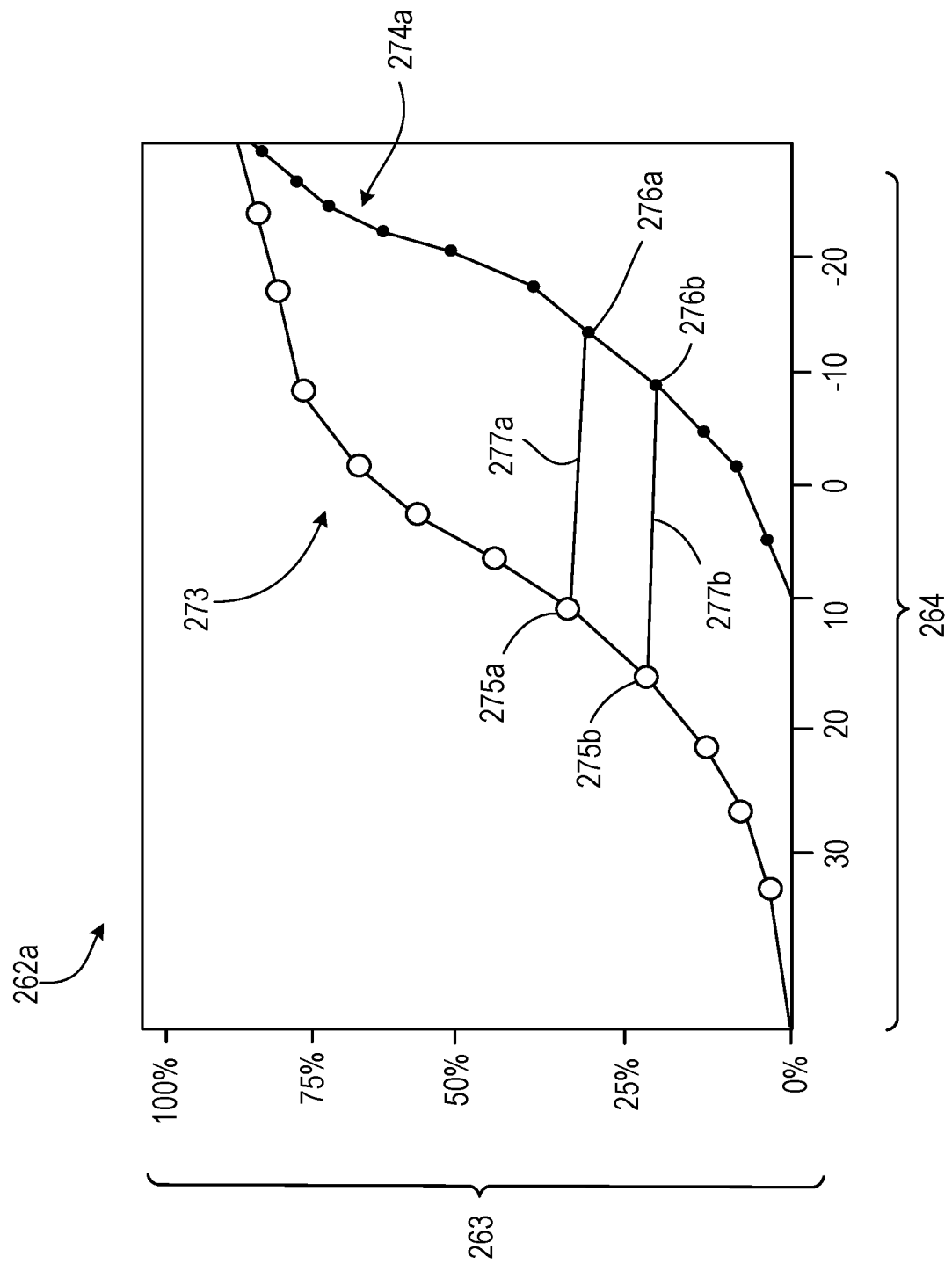
FIGS. 4-5 show comparisons of cumulative distribution functions.

FIG. 4 shows a comparison 262a of two cumulative distribution functions 273, 274a. One cumulative distribution functions 274a represents a reference cumulative distribution function stored in association with one of the stored signal profiles 242a. For example, this cumulative distribution function 274a may represent a stored signal profile 242a representative of poor signal quality. The other cumulative distribution function 273 represents a cumulative distribution function computed from a histogram 214 computed from data 212 received from a GNSS receiver 210. The two cumulative distribution functions 273, 274a can be compared to determine their similarity. For example, the difference 277a, 277b can be calculated between data points (e.g, data points 275a, 275b) of the received signal data cumulative distribution function 273 and data points (e.g, data points 276a, 276b) of the reference cumulative distribution function 274a.

Figure 5:
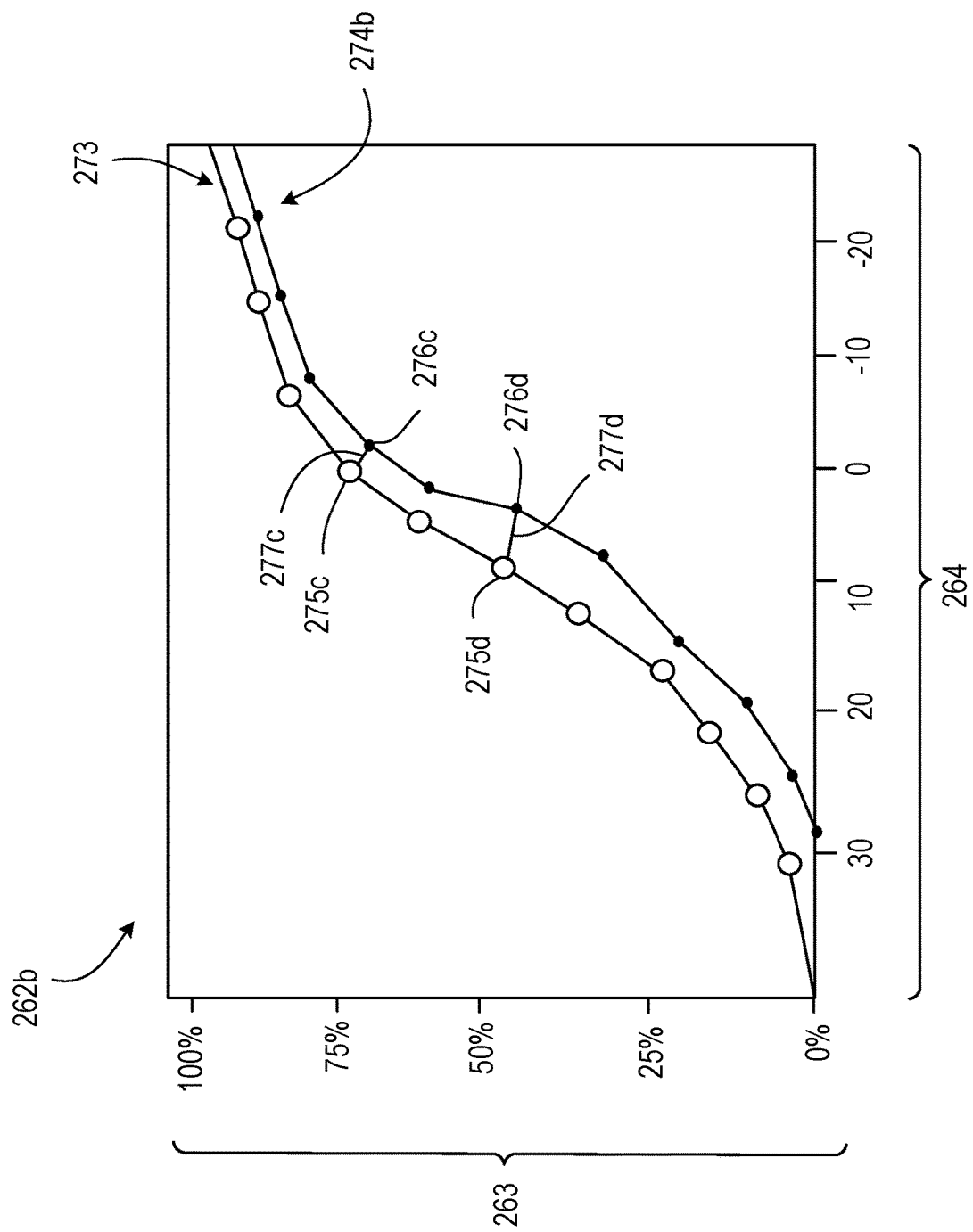

FIG. 5 shows a comparison 262b of two cumulative distribution functions 273, 274b. One cumulative distribution functions 274b represents a reference cumulative distribution function stored in association with a different stored signal profile 242b than the cumulative distribution function 274a shown in FIG. 4. For example, this cumulative distribution function 274b may represent a stored signal profile 242b representative of adequate signal quality. Further, as in the comparison 262a shown in FIG. 4, the other cumulative distribution function 273 represents the cumulative distribution function computed from a histogram 214 computed from data 212 received from a GNSS receiver 210. The two cumulative distribution functions 273, 274d can be compared to determine their similarity. For example, the difference 277c, 277d can be calculated between data points (e.g, data points 275c, 275d) of the received signal data cumulative distribution function 273 and data points (e.g, data points 276c, 276d) of the reference cumulative distribution function 274b.

The comparisons 262a, 262b can be used to determine which cumulative distribution function 274a, 274b most closely matches the received signal data cumulative distribution function 273. For example, the squares of the differences (e.g., differences 277a, 277b) calculated in the first comparison 262a can be added together, and the squares of the differences (e.g., differences 277c, 277d) calculated in the first comparison 262a can be added together. The sums of the squares can be sorted, and the sum having the lowest value can be used as an indication of which cumulative distribution function 274a, 274b most closely matches the received signal data cumulative distribution function 273. This technique is sometimes referred to as a least squares technique. For example, the sum of the squares of the differences 277c, 277d calculated in the second comparison 262b will be lower than the sum of the squares of the differences 277a, 277b calculated in the first comparison 262a because the received signal data cumulative distribution function 273 has values much closer to the values of the second reference cumulative distribution function 274b than to the values of the reference cumulative distribution function 274a. Thus, the second comparison 262b more closely matches the received signal data cumulative distribution function 273. If the second reference cumulative distribution function 274b is closest to the received signal data cumulative distribution function 273 out of the cumulative distribution functions associated with the other stored signal profiles 242a-d, then the stored signal profile 242b associated with the second reference cumulative distribution function 274b can be used to determine the value 232 of the current quality metric.

Figure 6:
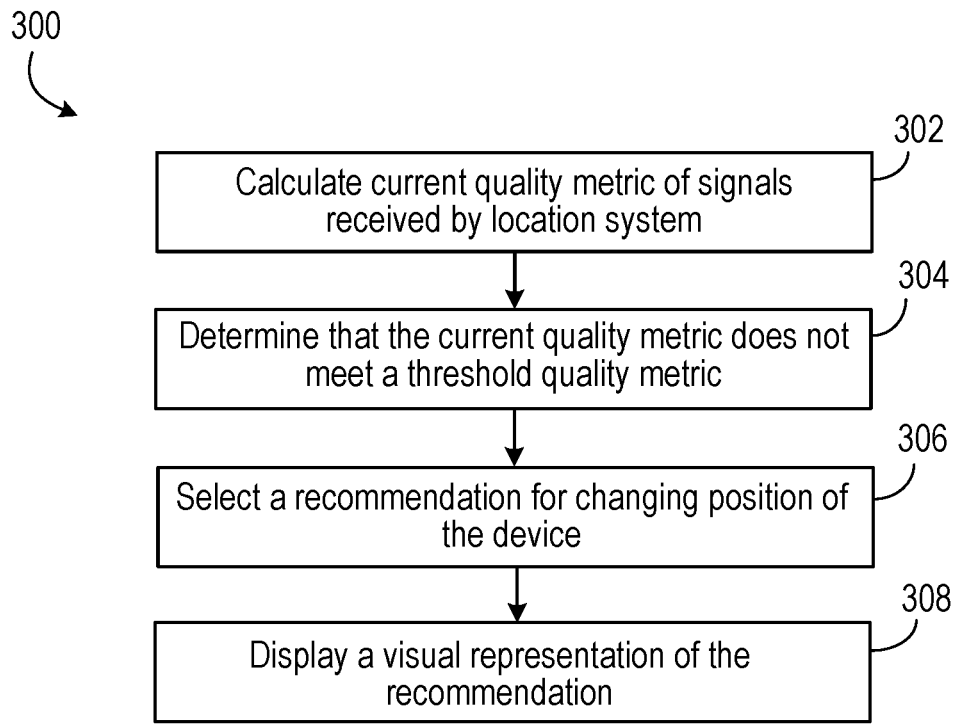
FIGS. 6-7 are flow diagrams of exemplary processes of determining signal quality.

FIG. 6 is flow diagram of an exemplary process 300 for determining signal quality on an electronic device. The process 300 can be performed, for example, by one or more modules of the mobile device 100 shown in FIG. 1. In some examples, the process 300 could be carried out by executing instructions stored on a non-transitory computer readable medium such as a computer readable storage device.

A current quality metric of signals received by a location system is calculated (302). The signals are received by a location system of the electronic device. For example, the location system may be the GNSS module 110 shown in FIG. 1. In some examples, the current quality metric can be selected from a set of stored profiles, e.g., the stored signal profiles 242a-d shown in FIG. 2.

In some examples, data describing quality of the signals received by the location system is computed, and a signal quality profile that most closely matches the computed data is determined from a set of location system signal quality profiles. For example, the computed data may include at least one of a cumulative distribution function and a histogram. The data may be determined based on a vector of carrier-to-noise ratios of the signals. The chosen signal quality profile can be used to derive the current quality metric. A process 320 for determining a matching signal profile is described below with respect to FIG. 7.

A determination is made that the current quality metric of signals does not meet a threshold quality metric (304). In some examples, the current quality metric meets the threshold quality metric when a value of the current quality metric exceeds the threshold, and the current quality metric does not meet the threshold quality metric when a value of the current quality metric does not exceed the threshold. In some implementation where the current quality metric is selected from a set of quality metrics, and the threshold quality metric is one or more of the quality metrics of the set.

In some implementations, the threshold quality metric includes a determination that the signal quality profile that most closely matches the computed data is designated as a signal quality profile indicating low signal quality. In this way, the threshold quality metric can be a boundary between signal quality profiles.

A recommendation for changing a position of the device in a manner that would alter the current quality metric is selected (306). For example, the recommendation can be the recommendation 234 shown in FIG. 2. In some implementations, a visual representation of the recommendation is displayed on a user interface of the electronic device (308). For example, the recommendation icon 206 shown in FIG. 2 could be an example of the visual representation.

In some implementations, the recommendation is selected in part by determining a classification of a current activity of a user of the electronic device. In these implementations, the recommendation is selected based on the determined classification. In some examples, the classification may be determined when the current quality metric does not meet the threshold quality metric, and the classification may not determined when the current quality metric does meet the threshold quality metric.

Figure 7:
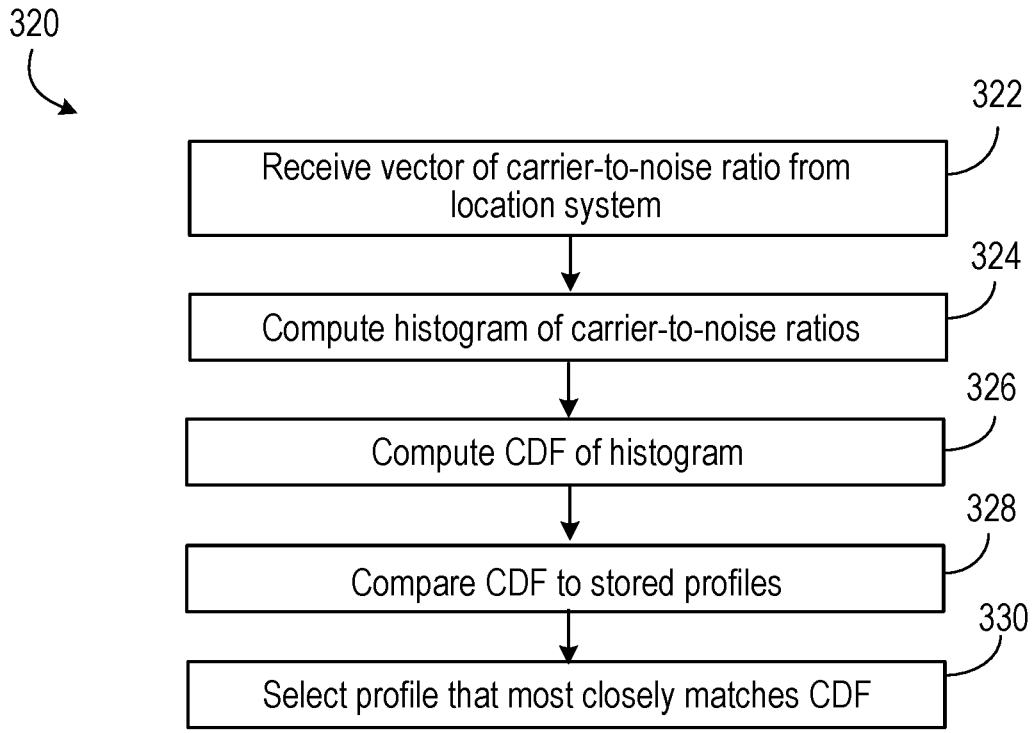

FIG. 7 is flow diagram of another exemplary process 320 for determining signal quality on an electronic device. The process 320 can be performed, for example, by one or more modules of the mobile device 100 shown in FIG. 1. In some examples, the process 320 could be carried out by executing instructions stored on a non-transitory computer readable medium such as a computer readable storage device.

A vector of carrier-to-noise ratios is received from a location system of an electronic device (322). For example, the vector can be a component of the data 212 received from the GNSS receiver 210 shown in FIG. 2.

A histogram of the carrier-to-noise ratios is computed (324). For example, the histogram can be the histogram 214 shown in FIGS. 2-3. The histogram can include multiple ranges of carrier-to-noise ratios, and can include the number of signals that have a carrier-to-noise ratio within each specified range. In some implementations, multiple histograms are computed and stored in a buffer. For example, the histograms can be computed on multiple occasions over a period of time, e.g. over the last N seconds.

A cumulative distribution function (CDF) of the histogram is computed (326). The CDF describes the probability that a variable will be less than or equal to a particular value based on a body of source data. For example, the particular value can be a carrier-to-noise ratio, and the body of course data can be the data used to compute the histogram. In some implementations, a combination of histograms is used to compute the CDF.

The computed CDF is compared to one or more CDFs associated with stored profiles (328). For example, the stored profiles can be the stored signal profiles 242a-d shown in FIG. 2. An example of these comparisons 262a, 262b are shown in FIGS. 3-4.

A profile is selected that most closely matches the CDF (330). For example, the profile can be selected if it is associated with a CDF that most closely matches the computed CDF, e.g., based on a least squares technique as described above with respect to FIGS. 4-5.

Figure 8:
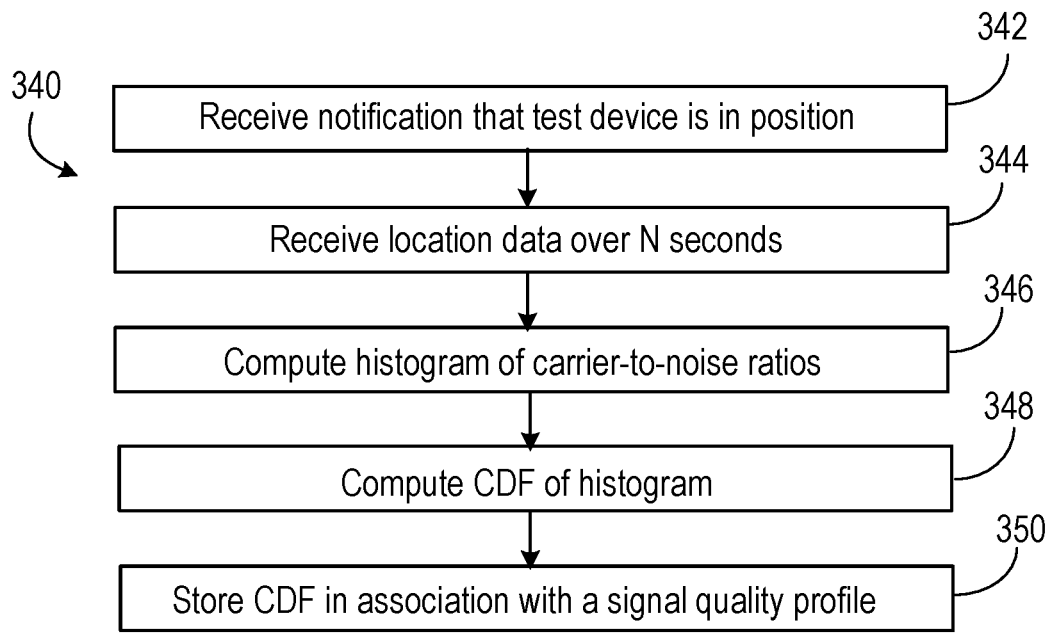
FIG. 8 is a flow diagram of an exemplary process for computing one or more stored profiles.

FIG. 8 is flow diagram of an exemplary process 340 for computing one or more stored profiles representing a signal quality metric. The process 340 can be performed, for example, by one or more modules of an electronic device such as the mobile device 100 shown in FIG. 1 or any other kind of electronic device having location functionality. In some examples, the process 340 could be carried out by executing instructions stored on a non-transitory computer readable medium such as a computer readable storage device. The process 340 can be carried out to compute the stored signal profiles 242a-d shown in FIG. 2, e.g., so that the computed stored profiles can be made available to mobile devices 100. The process 340 may be carried out once by a designer or manufacturer of the mobile devices 100, and then the stored profiles can be stored on and used by many mass-produced mobile devices 100.

A notification is received that a test device is in position (342). For example, the test device could be an electronic device such as the mobile device 100 shown in FIG. 1. The position can be chosen to correspond to a position and/or orientation having a known effect on signal quality. For example, the arrangement 130a shown in FIG. 1 may be known to have an effect on signal quality such that the mobile device 100 experiences poor signal quality when positioned in the arrangement 130a shown. As another example, the arrangement 130b shown in FIG. 1 may be known to have an effect on signal quality such that the mobile device 100 experiences good signal quality when positioned in the arrangement 130b shown. The effect on signal quality can be determined, e.g., based on experimental data.

Location data is received over N seconds (344). For example, the location data may include carrier-to-noise ratio of signals received from GNSS satellites, e.g., the satellites 120a-d shown in FIG. 1. The number of seconds may be recorded and stored in association with the stored profiles and/or stored in a manner that the number can be made available to mobile devices 100.

A histogram of the carrier-to-noise ratios is computed (346). For example, the histogram can be the histogram 214 shown in FIGS. 2-3. The histogram can include multiple ranges of carrier-to-noise ratios, and can include the number of signals that have a carrier-to-noise ratio within each specified range. In some implementations, multiple histograms are computed and stored in a buffer. For example, the histograms may be computed on multiple occasions over a period of time, e.g. over the last N seconds.

A CDF of the histogram can be computed (348). For example, the CDF can be one of the reference CDFs 274a, 274b shown in FIGS. 4-5. In some implementations, if multiple histograms are computed, the combination of the multiple histograms can be used to compute the CDF.

The CDF is stored in association with a signal quality profile (350). The signal quality profile may be one of the stored signal profiles 242a-d shown in FIG. 2. For example, the signal quality profile may include a data file, and the CDF can be stored as data within the data file. The signal quality profile may include other data such as a value of a signal quality metric (e.g., the value 232 shown in FIG. 2).

The test device can be moved to a different location and the process 340 can be carried out again to compute a different stored signal profile 242a-d.

Figure 9:
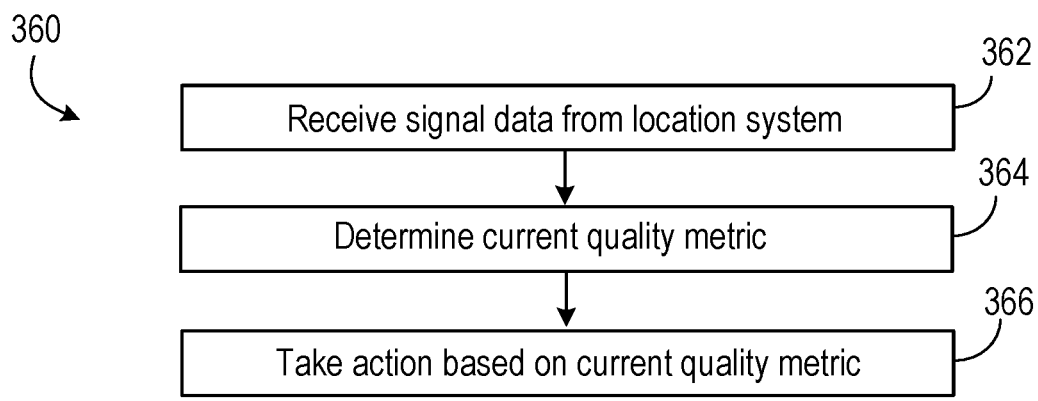
FIG. 9 is another flow diagram of an exemplary process of determining signal quality.

FIG. 9 is flow diagram of another exemplary process 360 for determining signal quality on an electronic device. The process 360 can be performed, for example, by one or more modules of the mobile device 100 shown in FIG. 1. In some examples, the process 360 could be carried out by executing instructions stored on a non-transitory computer readable medium such as a computer readable storage device.

Signal data is received from a location system of an electronic device (362). For example, the location system may be the GNSS module 110 shown in FIG. 1. The signal data may be the data 212 shown in FIG. 2, e.g., a vector of carrier-to-noise ratios. The signal data may be derived from signals 122a-d received from satellites 120a-d as shown in FIG. 1.

A current quality metric of the signals is calculated (364). In some examples, the current quality metric can be selected from a set of stored profiles, e.g., the stored signal profiles 242a-d shown in FIG. 2. In some examples, data describing quality of the signals received by the location system is computed, and a signal quality profile that most closely matches the computed data is determined from a set of location system signal quality profiles. The chosen signal quality profile can be used to derive the current quality metric. A process 320 for determining a matching signal profile is described above with respect to FIG. 7.

An action is taken based on a value of the current quality metric (366). For example, the action can be carried out by one or more modules of the electronic device.

In some examples, the action includes selecting a recommendation for changing a position of the device in a manner that would alter the current quality metric. For example, the recommendation could be represented in a user interface as a visual icon such as the recommendation icon 206 shown in FIG. 2.

In some implementations, the action includes displaying a visual representation of signal quality. For example, the quality indicator 204 shown in FIG. 2 could be an example of a visual representation of signal quality.

In some examples, the action includes determining whether to download GNSS assistance data. For example, if current signal quality is poor, the action could include downloading GNSS assistance data that can be used to acquire location data from other sources (e.g., from a location system that determines location information based on WiFi access points).

In some implementations, the mobile device 100 (FIG. 1) has access to multiple types of GNSS systems (e.g., GPS and GLONASS) that can both be used to determine location information. If the current quality metric indicates that GPS signal quality is good, then the GLONASS system may not need to be used, and components used for receiving data from GLONASS satellites or processing GLONASS satellite data or both can be powered down.

Figure 10:
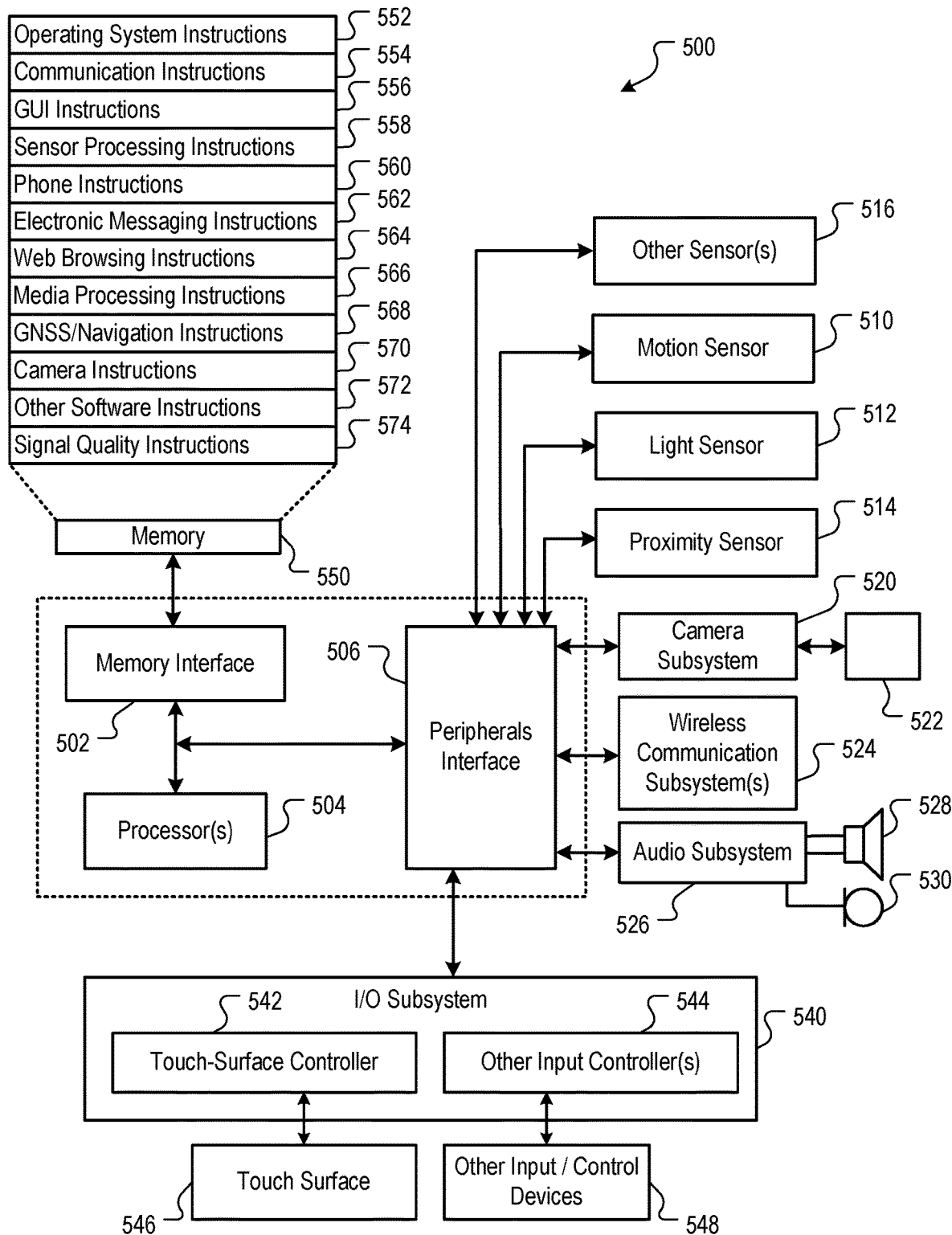
FIG. 10 is a block diagram of an exemplary system architecture implementing the features and processes of FIGS. 1-9.

FIG. 10 is a block diagram of an example computing device 500 that can implement the features and processes of FIGS. 1-9. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GNSS receiver), a temperature sensor, a biometric sensor, or other sensing device, to facilitate related functionalities. In some examples, the motion sensor 510 is an accelerometer. For example, the motion sensor 510 may detect acceleration of the computing device 500, speed of motion of the computing device 500, and other values indicative of the movement of the computing device 500.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 500 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication. In some implementations, audio recorded by the audio subsystem 526 is transmitted to an external resource for processing. For example, voice commands recorded by the audio subsystem 626 may be transmitted to a network resource such as a network server which performs voice recognition on the voice commands.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the security lockout and voice authentication features. Operating system 552 can implement the voiceprint and voice authentication features.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions, such as the process described in reference to FIG. 4; and/or camera instructions 570 to facilitate camera-related processes and functions.

The memory 550 can store other software instructions 572 to facilitate other processes and functions, such as the security and/or authentication processes and functions. For example, the software instructions can include instructions for performing voice authentication on a per application or per feature basis and for allowing a user to configure authentication requirements of each application or feature available on device 500.

In some implementations, the memory 550 stores signal quality instructions 574. For example, the signal quality instructions 574 can be used to evaluate the signal quality of signals received from a location system. An example of these techniques are shown in FIGS. 1-9. In some implementations, at least some of the signal quality instructions 574 can be carried out by the GNSS data processor 230 shown in FIG. 2.

The memory 550 can also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims. For example, the techniques described above with respect to determining a current quality metric of a GNSS location system can also be used to determine a current quality metric of another kind of system that uses signals such as radio frequency signals. For example, the techniques described can be used to gather signal-to-noise/carrier-to-noise ratios of cellular telephone/data network signals, or WiFi (wireless network signals), and determine a quality metric of the signals.

What is claimed is:

1. A method comprising:
   detecting, on a mobile device at a first time, signals from one or more GNSS signal sources used to determine a location of the mobile device;
   determining, by the mobile device based on signal strength of the detected signals, a first current quality metric of the detected signals;
   displaying, by the mobile device, a first indicator representing the first current quality metric;
   determining, by the mobile device, that the first current quality metric does not meet a threshold quality metric associated with a threshold accuracy and precision of the location of the mobile device determined using the detected signals;
   providing, to an activity classifier of the mobile device, activity data output from one or more motion sensors of the mobile device representing an activity engaged in by a user of the mobile device during the first time;
   determining, by the activity classifier based on the activity data output, the activity engaged in by the user of the mobile device during the first time, comprising selecting the activity from among a plurality of candidate user activities based on the activity data output wherein the activity engaged in by the user of the mobile device during the first time is walking;
   generating, by the mobile device, multiple recommendations for changing positions of the mobile device, each of the multiple recommendations being based upon the activity engaged in by the user of the mobile device during the first time;
   selecting, by the mobile device, a recommendation from among the multiple recommendations generated by the mobile device for changing a first position of the mobile device in a manner that would alter the first current quality metric, wherein the selected recommendation comprises an indication to move the mobile device to a hand of the user;
   outputting, by the mobile device, a representation of the selected recommendation; and subsequent to change of the first position of the mobile device to a second position by the user of the mobile device, displaying, by the mobile device, a second indicator representing a second current quality metric of GNSS signals received by the mobile device at a second time and at the second position, the second current quality metric representative of signal quality that is better than the first current quality metric.

2. The method of claim 1, comprising:
computing data describing quality of the detected signals; and
determining, from a set of location system signal quality profiles, a signal quality profile that most closely matches the computed data.

3. The method of claim 2, wherein the computed data comprises at least one of a cumulative distribution function and a histogram.

4. The method of claim 2, wherein the threshold quality metric comprises a determination that the signal quality profile that most closely matches the computed data is designated as a signal quality profile indicating low signal quality.

5. The method of claim 1, comprising:
determining a classification of a current activity of a user of the mobile device,
wherein the recommendation is selected based on the determined classification.

6. The method of claim 5, wherein:
the classification is determined when the current quality metric does not meet the threshold quality metric; and
the classification is not determined when the current quality metric does meet the threshold quality metric.

7. The method of claim 1, wherein the current quality metric is determined based on a vector of signal to noise ratios of the detected signals.

8. The method of claim 1, wherein:
the current quality metric is selected from a set of quality metrics; and
the threshold quality metric is one or more of the quality metrics of the set.

9. The method of claim 1, wherein the current quality metric comprises a cumulative distribution function computed based on multiple histograms computed over a time period.

10. The method of claim 1, wherein the plurality of candidate user activities comprises at least one of walking, running, or driving a vehicle.

11. One or more non-transitory media comprising computer-readable instructions that, when executed by one or more processors, cause the one or more processors to perform operations comprising:
detecting, at a first time, signals from one or more GNSS signal sources used to determine a location of the mobile device;
determining, based on signal strength of the detected signals, a first current quality metric of the detected signals;
displaying a first indicator representing the first current quality metric;
determining that the first current quality metric does not meet a threshold quality metric associated with a threshold accuracy and precision of the location of the mobile device determined using the detected signals;
providing, to an activity classifier of the mobile device, activity data output from one or more motion sensors of the mobile device representing an activity engaged by a user of the mobile device during the first time;
determining, by the activity classifier based on the activity data output, the activity engaged in by the user of the mobile device during the first time, comprising selecting the activity from among a plurality of candidate user activities based on the activity data output wherein the activity engaged in by the user of the mobile device during the first time is running;
generating multiple recommendations for changing positions of the mobile device, each of the multiple recommendations being based upon the activity engaged in by the user of the mobile device during the first time;
selecting a recommendation from among the multiple recommendations generated by the mobile device for changing a first position of the mobile device in a manner that would alter the first current quality metric, wherein the selected recommendation comprises an indication to move the mobile device to an arm of the user;
outputting a representation of the selected recommendation; and
subsequent to change of the first position of the mobile device to a second position by the user of the mobile, displaying a second indicator representing a second current quality metric of GNSS signals received by the mobile device at a second time and at the second position, the second current quality metric representative of signal quality that is better than the first current quality metric.

12. The one or more non-transitory media of claim 11, the operations comprising:
computing data describing quality of the detected signals; and
determining, from a set of location system signal quality profiles, a signal quality profile that most closely matches the computed data.

13. The one or more non-transitory media of claim 12, wherein the computed data comprises at least one of a cumulative distribution function and a histogram.

14. The one or more non-transitory media of claim 12, where the threshold quality metric comprises a determination that the signal quality profile that most closely matches the computed data is designated as a signal quality profile indicating low signal quality.

15. The one or more non-transitory media of claim 11, the operations comprising:
determining a classification of a current activity of a user of the mobile device,
wherein the recommendation is selected based on the determined classification.

16. The one or more non-transitory media of claim 15, wherein:
the classification is determined when the current quality metric does not meet the threshold quality metric; and
the classification is not determined when the current quality metric does meet the threshold quality metric.

17. The one or more non-transitory media of claim 11, wherein the current quality metric is determined based on a vector of signal to noise ratios of the detected signals.

18. The one or more non-transitory media of claim 11, wherein:
the current quality metric is selected from a set of quality metrics; and
the threshold quality metric is one or more of the quality metrics of the set.

19. The one or more non-transitory media of claim 11, wherein the current quality metric comprises a cumulative distribution function computed based on multiple histograms computed over a time period.

20. The one or more non-transitory media of claim 11, wherein the plurality of candidate user activities comprises at least one of walking, running, or driving a vehicle.

21. A mobile device comprising:
a location system configured to determine a current location of the mobile device; and
one or more processors configured for:
  detecting, at a first time, signals from one or more GNSS signal sources used to determine a location of the mobile device;
  determining, based on signal strength of the detected signals, a first current quality metric of the detected signals;
  displaying a first indicator representing the first current quality metric;
  determining that the first current quality metric does not meet a threshold quality metric associated with a threshold accuracy and precision of the location of the mobile device determined using the detected signals;
  providing, to an activity classifier of the mobile device, activity data output from one or more motion sensors of the mobile device representing an activity engaged by a user of the mobile device during the first time;
  determining, by the activity classifier based on the activity data output, the activity engaged in by the user of the mobile device during the first time, comprising selecting the activity from among a plurality of candidate user activities based on the activity data output, wherein the activity engaged in by the user of the mobile device during the first time is driving a vehicle;
  generating multiple recommendations for changing positions of the mobile device, each of the multiple recommendations being based upon the activity engaged in by the user of the mobile device during the first time;
  selecting a recommendation from among the multiple recommendations generated by the mobile device for changing a first position of the mobile device in a manner that would alter the first current quality metric, wherein the selected recommendation comprises an indication to move the mobile device to a windshield-mounted cradle within the vehicle;
  outputting a representation of the selected recommendation; and
  subsequent to change of the first position of the mobile device to a second position by the user of the mobile, displaying a second indicator representing a second current quality metric of GNSS signals received by the mobile device at a second time and at the second position, the second current quality metric representative of signal quality that is better than the first current quality metric.

22. The mobile device of claim 21, wherein the second indicator representing the second current quality metric of signals received by the location system of the mobile device is displayed at a time in which the mobile device has moved to the second position that would alter the first current quality metric.

23. The mobile device of claim 21, wherein the plurality of candidate user activities comprises at least one of walking, running, or driving a vehicle.

24. A method comprising:
detecting, on a mobile device at a first time, signals from one or more GNSS signal sources used to determine a location of the mobile device;
determining, by the mobile device based on signal strength of the detected signals, a first current quality metric of the detected signals;
displaying, by the mobile device, a first indicator representing the first current quality metric;
determining, by the mobile device, that the first current quality metric does not meet a threshold quality metric associated with a threshold accuracy and precision of the location of the mobile device determined using the detected signals;
providing, to an activity classifier of the mobile device, activity data output from one or more motion sensors of the mobile device representing an activity engaged in by a user of the mobile device during the first time;
determining, by the activity classifier based on the activity data output, the activity engaged in by the user of the mobile device during the first time, comprising selecting the activity from among a plurality of candidate user activities based on the activity data output, wherein the activity engaged in by the user of the mobile device during the first time is at least one of walking, running, or driving a vehicle;
generating, by the mobile device, multiple recommendations for changing positions of the mobile device, each of the multiple recommendations being based upon the activity engaged in by the user of the mobile device during the first time;
selecting, by the mobile device, a recommendation from among the multiple recommendations generated by the mobile device for changing a first position of the mobile device in a manner that would alter the first current quality metric,
wherein the selected recommendation comprises at least one of:
  an indication to move the mobile device to a hand of the user when the activity engaged in by the user of the mobile device during the first time is walking,
  an indication to move the mobile device to an arm of the user when the activity engaged in by the user of the mobile device during the first time is running, or
  an indication to move the mobile device to a windshield-mounted cradle within the vehicle when the activity engaged in by the user of the mobile device during the first time is driving the vehicle;
outputting, by the mobile device, a representation of the selected recommendation; and
subsequent to change of the first position of the mobile device to a second position by the user of the mobile device, displaying, by the mobile device, a second indicator representing a second current quality metric of GNSS signals received by the mobile device at a second time and at the second position, the second current quality metric representative of signal quality that is better than the first current quality metric.

* * * * *